US009088808B1

(12) United States Patent
He et al.

(10) Patent No.: US 9,088,808 B1
(45) Date of Patent: Jul. 21, 2015

(54) USER INTERACTION BASED RELATED VIDEOS

(75) Inventors: Yu He, Sunnyvale, CA (US); David Petrie Stoutamire, Redwood City, CA (US)

(73) Assignee: Google Inc., Mountain View, CA (US)

( * ) Notice: Subject to any disclaimer, the term of this patent is extended or adjusted under 35 U.S.C. 154(b) by 1610 days.

(21) Appl. No.: 12/028,710

(22) Filed: Feb. 8, 2008

(51) Int. Cl.
  H04N 21/25 (2011.01)
  H04N 21/442 (2011.01)
  H04N 21/475 (2011.01)

(52) U.S. Cl.
  CPC ............ *H04N 21/251* (2013.01); *H04N 21/252* (2013.01); *H04N 21/44204* (2013.01); *H04N 21/4756* (2013.01)

(58) Field of Classification Search
  CPC .......... H04N 21/251; H04N 21/44204; H04N 21/4756
  USPC ......................... 707/736, 748; 725/38, 44, 46
  See application file for complete search history.

(56) References Cited

U.S. PATENT DOCUMENTS

| | | | |
|---|---|---|---|
| 6,282,548 B1 | 8/2001 | Burner et al. | |
| 7,165,069 B1 | 1/2007 | Kahle et al. | |
| 7,617,127 B2 | 11/2009 | Hunt et al. | |
| 8,001,567 B2 * | 8/2011 | Ozer et al. | 725/44 |
| 2005/0193414 A1 * | 9/2005 | Horvitz et al. | 725/46 |
| 2008/0010253 A1 * | 1/2008 | Sidhu et al. | 707/3 |
| 2008/0040474 A1 | 2/2008 | Zuckerberg et al. | |
| 2008/0091670 A1 * | 4/2008 | Ismalon | 707/5 |
| 2009/0119278 A1 | 5/2009 | Cross et al. | |
| 2009/0133048 A1 | 5/2009 | Gibbs et al. | |
| 2010/0049770 A1 | 2/2010 | Ismalon | |
| 2010/0223646 A1 * | 9/2010 | Goldeen et al. | 725/46 |

OTHER PUBLICATIONS

Linden, G., et al., "Amazon.com Recommendations Item-to-Item Collaborative Filtering," IEEE Internet Computing, Jan./Feb. 2003, pp. 76-80.

* cited by examiner

*Primary Examiner* — Benjamin R Bruckart
*Assistant Examiner* — Jason Thomas
(74) *Attorney, Agent, or Firm* — Fenwick & West LLP (57) ABSTRACT

Methods and systems to locate related videos in a video access log. In one embodiment, the method comprises extracting user events from a log database, tagging each event as positive or negative, determining if a video is positively interacted and processing the tagged videos in a sliding window to determine positive interactions between a pair of videos.

18 Claims, 4 Drawing Sheets

USER INTERACTION BASED RELATED VIDEOS

TECHNICAL FIELD

The invention relates to data retrieval, and more particularly, to methods for identifying videos that are related to each other.

BACKGROUND ART

Video hosting websites allow users to access videos by both searching using keywords and by browsing in categories or channels. Using either approach, a user is presented with a list of videos from which he can choose to view. Once a user finds a video of interest and selects a link to the video, the link directs the user to a webpage where the video or details of the video may be viewed. The video hosting website may allow a user to search and view videos contained within the video hosting website, or videos located or, or sourced from other websites. In some video hosting websites, the selection of a video viewing causes the system to display a set of videos that are related to the video being viewed. In conventional methods, the related videos are determined using keywords from an initial search, or based upon tags associated with the currently viewed video, or based upon which videos or authors are popular.

While the conventional method can select videos that are potentially of interest to the user, many times the selected videos do not contain the material the user is interested in and it requires effort on the user's part to view the content of the individual videos to determine for themselves if the video contains relevant material. Accordingly, users waste valuable time viewing videos with potentially no related content instead of initially being displayed related videos with a high probability of containing truly relevant or interesting material.

SUMMARY

Embodiments of the present invention provide methods and systems for determining related videos which are related to each based upon user interactions. Videos that users positively interact with within a locality in time are identified. Thus, if a user watches one video and then next watches another video, these two videos have positive interactions within a limited time span; these positive interactions are an example of co-occurring positive interactions. A sufficient number of positive interactions between two videos (e.g., from multiple users) are used to identify the two videos as being related.

For example, a number of users may view a video of a Porsche 997 Turbo by one contributor, and then watch a video of Ferrari F430 by another contributor within a selected time interval. These positive interactions are identified based on logs of user interactions stored in a video access log. User interactions include use of any of the controls for video playback such as play, pause, forward or rewind, as well as interactions with the website such as performing a search, changing a page or accessing links in the website. If a sufficient number of such positive interactions between these two videos are identified, then the videos are deemed to be related. This can be the case even if the video has little or no metadata in common, such as tags, keywords, contributors, or the like.

In one embodiment, a video hosting website maintains a log of user interactions with videos on the website. The log stores information about user events, where user events are user interactions with videos, such as when a user views a video, stops viewing, fast forwards, rewinds, and so forth. The log events are labeled as being positive or negative by a user interaction analysis server and a determination is made by the user interaction analysis server if the user positively or negatively interacted with a video based upon the log event data. Positive interactions of pairs of videos that co-occur within the log are identified in a sliding window and the counts of these interactions are accumulated to create a co-occurrence matrix. Once the positive interactions of pairs of videos have been determined for all users, the co-occurrence matrix is updated to include positive interaction counts across all users. In alternative embodiments, events produced by certain users may not be accounted for in the above determination, either because the users did not authorize their interactions with videos to be logged or because the users are not deemed appropriate participants. Users may not be deemed appropriate participants because the users are not registered users of the video hosting website, have been banned from the video hosting website or for any other appropriate reasons.

The co-occurrence table is analyzed to generate a ranked list of related videos for any target video based on the total amount of positive interactions. When a user views a particular video, the ranked list of related videos is concurrently displayed. The user can select one of the related videos for viewing.

The features and advantages described in this summary and the following detailed description are not all-inclusive. Many additional features and advantages will be apparent to one of ordinary skill in the art in view of the drawings, specification and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
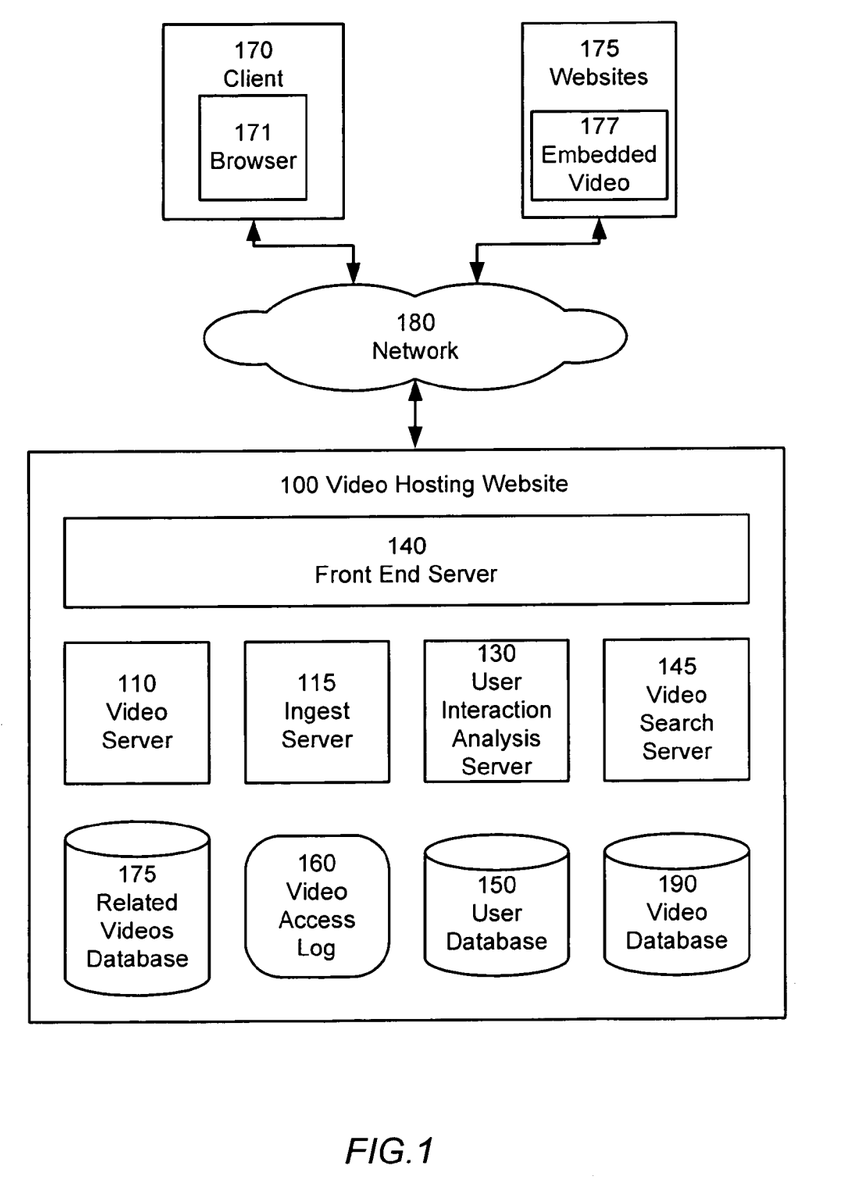
FIG. 1 is a block diagram of the system architecture of one embodiment of the present invention.

Referring now to FIG. 1, there is shown the system architecture of a video hosting website 100 in accordance with one embodiment of the present invention. As shown in FIG. 1, a video hosting website 100 comprises a front end server 140, a video server 110, an ingest server 115, a user interaction analysis server 130, a video search server 145, a related videos database 175, a video access log 160, a user database 150, and a video database 190. Many conventional features, such as firewalls, load balancers, application servers, failover servers, site management tools and so forth are not shown so as not to obscure the features of the system.

Most generally, the video hosting website 100 represents any system that allows users to access video content via searching and/or browsing interfaces. The sources of videos can be from user uploads of videos, searches or crawls of other websites or databases of videos, or the like, or any combination thereof. For example, in one embodiment a video hosting site 100 can be configured to allow for user uploads of content; in another embodiment a video hosting website 100 can be configured to only obtain videos from other sources by crawling such sources or searching such sources in real time. A suitable website 100 for implementation of the system is the YOUTUBE™ website, found at www.youtube.com; other video hosting sites are known as well, and can be adapted to operate according to the teaching disclosed herein. It will be understood that the term "web site" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

Each of the various servers is implemented as server program executing on server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

A client 170 executes a browser 171 and can connect to the front end server 140 via a network 180, which is typically the internet, but can also be any network, including but not limited to any combination of a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the video hosting website 100 at any time. The client 170 may include a variety of different computing devices. Examples of client devices 170 are personal computers, digital assistants, personal digital assistants, cellular phones, mobile phones, smart phones or laptop computers. As will be obvious to one of ordinary skill in the art, the present invention is not limited to the devices listed above.

The browser 171 can include a video player (e.g., Flash™ from Adobe Systems, Inc.), or any other player adapted for the video file formats used in the video hosting website 100. Alternatively, videos can be accessed by a standalone program separate from the browser 171. A user can access a video from the video hosting website 100 by browsing a catalog of videos, conducting searches on keywords, reviewing play lists from other users or the system administrator (e.g., collections of videos forming channels), or viewing videos associated with particular user groups (e.g., communities).

Users of clients 170 can also search for videos based on keywords, tags or other metadata. These requests are received as queries by the front end server 140 and provided to the video search server 145, which is responsible for searching the video database 190 for videos that satisfy the user queries. The video search server 145 supports searching on any fielded data for a video, including its title, description, tags, author, category and so forth.

Users of the clients 170 and browser 171 can upload content to the video hosting website 100 via network 180. The uploaded content can include, for example, video, audio or a combination of video and audio. The uploaded content is processed by an ingest server 115, which processes the video for storage in the video database 190. This processing can include format conversion (transcoding), compression, metadata tagging, and other data processing. An uploaded content file is associated with the uploading user, and so the user's account record is updated in the user database 150 as needed.

For purposes of convenience and the description of one embodiment, the uploaded content will be referred to a "videos," "video files," or "video items," but no limitation on the types of content that can be uploaded are intended by this terminology. Thus, the operations described herein for identifying related items can be applied to any type of content, not only videos; other suitable type of content items include audio files (e.g. music, podcasts, audio books, and the like), documents, multimedia presentations, and so forth. In addition, related items need not be of the same type. Thus, given a video, the related items may include one or more audio files, documents, and so forth in addition to other videos.

The video database 190 is used to store the ingested videos. The video database 190 stores video content and associated metadata, provided by their respective content owners. Each uploaded video is assigned a video identifier (id) when it is processed by the ingest server 115. The video files have metadata associated with each file such as a video ID, artist, video title, label, genre, time length, and optionally georestrictions that can be used for data collection or content blocking on a geographic basis.

The user database 150 is responsible for maintaining a record of all users viewing videos on the website. Each individual user is assigned a user ID, for example, based on his or her IP address to differentiate the individual users. This user ID is preferably an anonymized user ID that is assigned to each individual user to keep user identities private. For each user, the video access log 160 tracks the user's interactions with videos. Each entry in the video access log 160 identifies a video being accessed, a time of access, an IP address of the user, a user ID if available, cookies, the user's search query that led to the current access, data identifying the type of interaction with the video. Interaction types can include any user interactions in the user interface of the website 175, such as playing, pausing, rewinding and forwarding a video. The various user interaction types are considered user events that are associated with a given video. In alternative embodiments, user IDs many not be maintained and the video access log 160 stores all user events regardless of whether a user ID is known.

The user interaction analysis server 130 processes the events in the video access log 160 to determine related videos. The user interaction analysis server 130 operates to identify related videos for a given user, as well as related videos across all users. The cumulative data is aggregated and ranked to create a list of related videos for a target video. The related videos database 175 stores all the lists of related videos in the related videos database 170. The lists of related videos are updated each day, in one example, with the user interaction analysis server 130 performing a daily analysis of user events from the video access log 160 and user database 150. Once the list of related videos has been generated, the video server 110 can serve the related videos from the video database 190.

Video Serving

Figure 2:
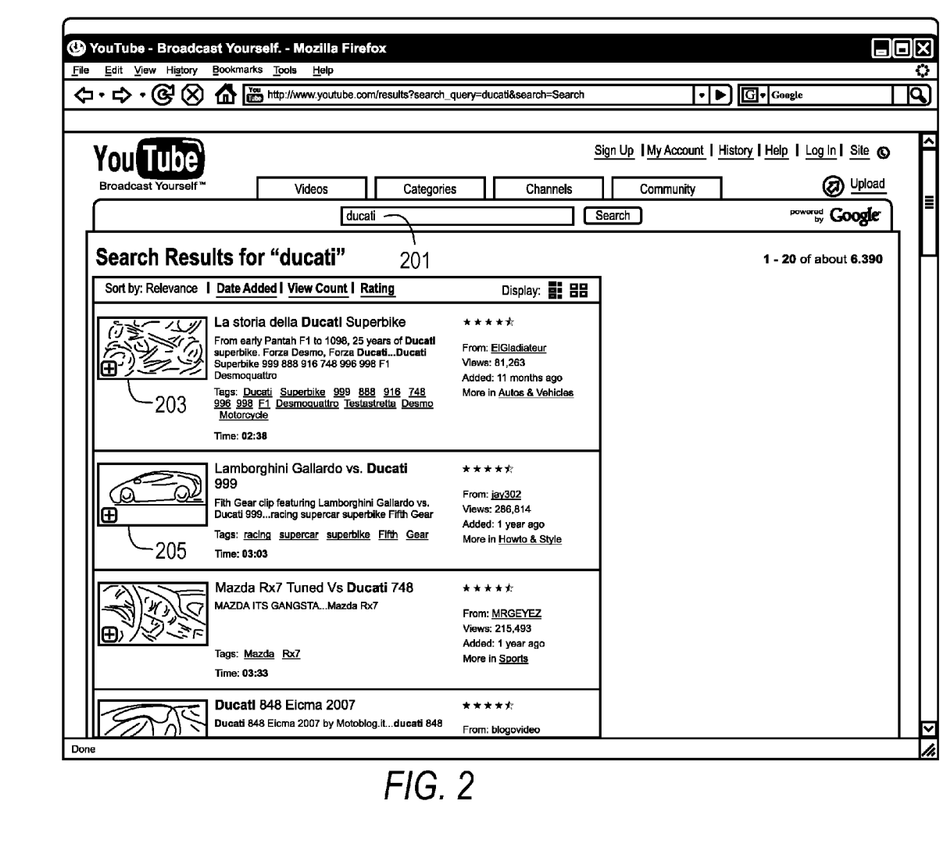
FIG. 2 illustrates an example of a user interface displaying videos associated with a user search query.

A user of client 170 executes the browser 171 to load a website 175, such as YOUTUBE™, to watch a video. The user can either search for videos using keywords, or may browse via various categories or channels. The video search server 145 locates appropriate videos in the video database 190 to return to client 170. Referring to FIG. 2, a user interface is displayed which illustrates a result page, from the website 175, responsive to the user querying the keyword "Ducati" into the dialog box 201. Accordingly, a list is displayed of appropriate videos for the keyword such as "La storia della Ducati Superbike" 203 and "Lamborghini Gallardo vs. Ducati 999" 205 that were retrieved from the video database 190. After reviewing the result page, the user can select a video from the result page to watch.

Figure 3:
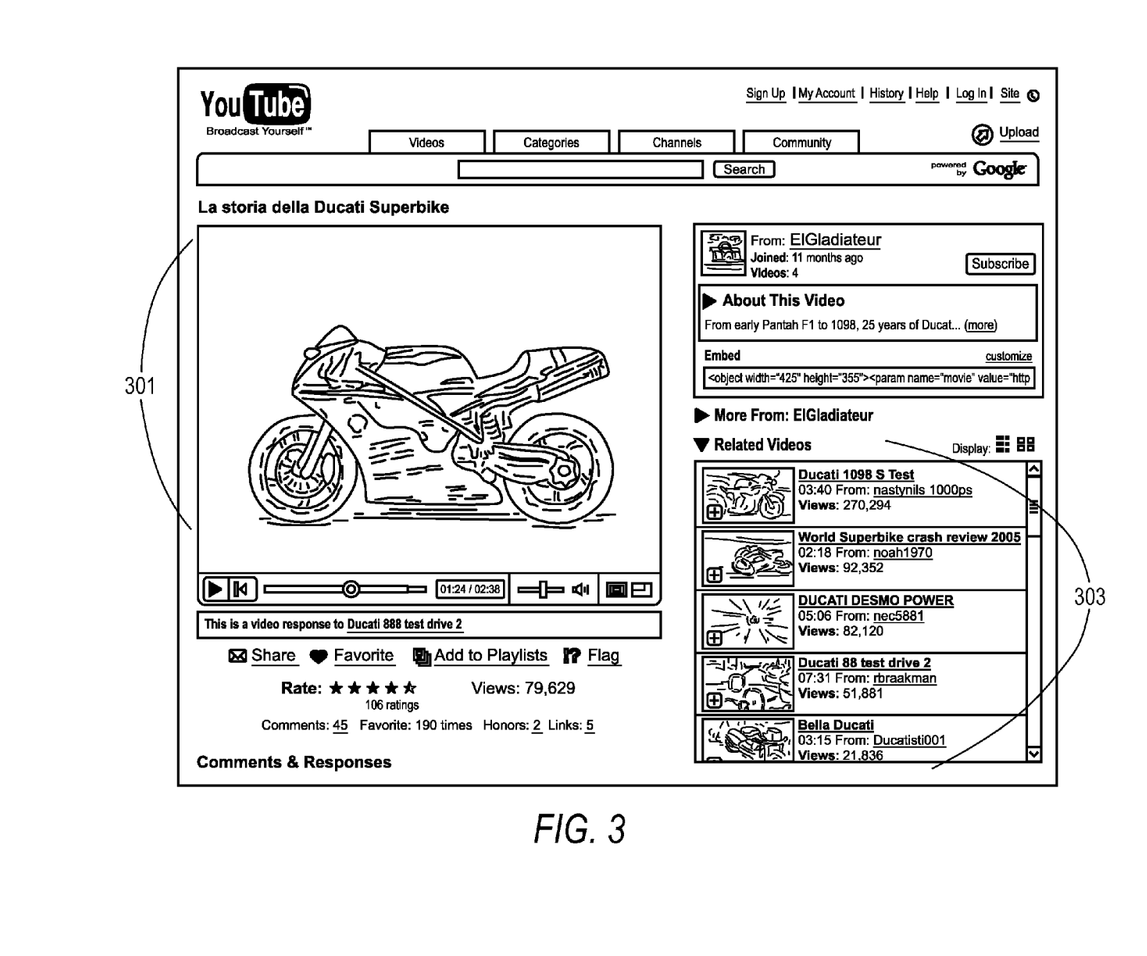
FIG. 3 illustrates an example of a user interface displaying the target video and its related videos.

After selection of the target video, the browser 171 displays a video viewing page with the selected video for presentation. FIG. 3 is illustrative, in one example, of a video viewing page. The browser 171 displays the selected target video 301, for the user to watch. The displayed page also depicts to the user, related videos 303 which are determined by the user interaction analysis server 130 using the user interaction analysis process. The videos that are identified to be related to a target video are retrieved from the video database 190 by the video server 110 for user presentation. The user interaction analysis process that determines the related videos for a target video is further described below.

User Interaction Analysis

The user interaction analysis process of the user interaction analysis server 130 determines related videos for a given video. Related videos are pairs of videos that users positively interact within a locality of time. The user interaction analysis server 130 determines that there is a sufficient count of positive interactions between pairs of videos across all users who have viewed the pairs of videos within a determined time interval. Positive interactions between pairs of videos can occur within a one hour time interval in one example. The user interaction analysis process that determines a related videos list is further described below.

Figure 4:
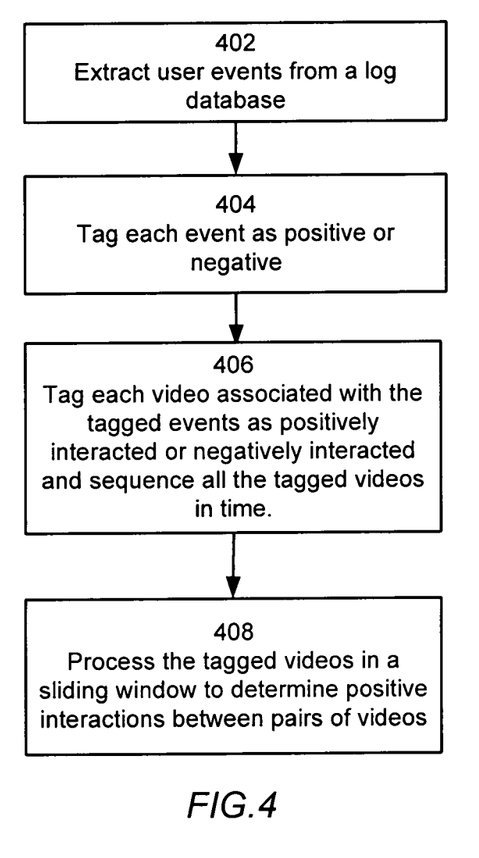
FIG. 4 illustrates a method for determining log based related videos in accordance with one embodiment of the present invention.

Referring now to FIG. 4, the user interaction analysis process according to one embodiment has the following functional stages:

402: Extract user events from a log database.
404: Tag each event as positive or negative.
406: Tag each video associated with the tagged events as positively interacted or negatively interacted and sequence all the tagged videos in time.
408: Process the tagged videos in a sliding window to determine positive interactions between pairs of videos.

Each of these stages will now be described in further detail.

The first stage 402 is a process repeated for each user having a user ID in the user database. For a given user, the user interaction analysis server 130 extracts events from the video access log 160. As a user interacts with the user interface shown in FIG. 3, the video access log 160 stores each interaction as an event. For every video, a record is kept of user interactions with the video via the website interface while watching the video. The website interface for viewing videos can be, for example, the interface shown in FIG. 3. User interactions include use of any of the controls for video playback (e.g., play, pause, forward, rewind), as well interactions with the site (search, change page, link accesses) that occur during the viewing of the video. Each interaction is associated with a time offset (or timestamp, or time code) that can be used, in one example, to tag events as either positive or negative interactions. For example, when a playback interaction is stored, a time offset indicating the continuous time duration in which the video was played is associated with the playback event. In the case of a playback interaction, the time offset is used to determine if the event is positive or negative based upon the play time (amount of time the user plays back the video), and/or a ratio of the play time and length of the video. For example, a user viewing a video for at least 30 seconds or at least 25% of a video's entire length, would indicate that the event can be identified as a positive interaction. Tagging events based upon time offsets is further described below.

Each user interaction is stored as an event in the video access log 160. The video access log 160 stores all user interactions for all videos stored in the video database 190. Each event entry in the video access log 160 includes the tag ID of the user viewing the video and a video ID to associate the event with a particular video. The tag ID differentiates the user events for each individual user and will be used in the user interaction analysis further described below.

In the first stage 402 of the user interaction analysis process, the user interaction analysis server 130 extracts the user events for a given user stored in video access log 160 for analysis to begin the user interaction analysis process to update the related videos database 170. The extracted list of stored events from the video access log 160 is then used in the second stage of the user interaction analysis.

The second stage 404 is a process by which for each user, the user interaction analysis server 130 tags the events associated with a video stored in the video access log 160 as either a positive or negative interaction. In one example, an event can be tagged "1" representing a positive interaction and can be tagged "0" representing a negative interaction (any equivalent coding system may be used as well). Tagging events "1" or "0" is merely illustrative of one method to tag events and any real-valued or discrete function can be used. An event is determined to be positive or negative based on various factors. For example, for a playback event, the user interaction analysis server 130 determines the time offset of the playback event. If the time offset in which the video was continuously played is equal to the length of the entire video, the playback event is tagged "1" indicating a positive event since the user viewed the entire video. Alternatively, if the ratio of the video watched versus the length of the entire video is greater than 75% than the playback event would be tagged "1" indicating a positive event. In other embodiments, if the user has viewed the video for a predefined length of time regardless of the video length, the event is tagged "1." For example, a user may have viewed a video for a total duration of 3 minutes, but the video length is only 1 minute long. This implies that the user viewed the video multiple times so the event would be tagged "1." A rating event also indicates a positive event if the user rated the video 5 out of 5 stars in one example. Alternatively, if the rating event is greater than a predetermined threshold, such as a rating above 3 out of 5 stars, the rating would indicate a positive event. A rewind event to the beginning of the video or back to a set percentage of the video is another indication of a positive event. Rewinding the video indicates that the video will be viewed again thus signifying a positive event. Additional positive events comprise scrolling the page or a frame of the page containing the video or fast forwarding or dragging the scroll button to move the position at which the video is playing may be indications of positive events. A negative event can comprise the user only viewing less than 25% of the entire video before playback is stopped, viewing the video less than a set amount of time (e.g., less than 5 seconds) or if the user provided a low rating of the video such as 1 out of 5 stars. Additionally, performing another search can be seen as a negative event as the user is not satisfied with the current video. Opening other web pages can indicate a negative event as the current video is not captivating the user's attention. Analysis of text comments and/or comments in webcam form (including either video or audio comments) can also be used to determine whether an event is to be tagged a positive or negative event depending on the comments. Any discernable interaction with the website may illuminate the user's satisfaction with the video can be used to tag events as either positive or negative, so long as the semantics of the interaction can be meaningfully correlated with a user intent. Upon completion of this stage, the user interaction analysis server 130 has a list of tagged events for a given user. This list of events may be time delimited (events in the last month or week, for example), or for all events by the user.

The third stage 406 of the user interaction analysis process determines if a video was positively interacted with by a user. The user interaction analysis server 130 determines based upon the list of tagged events associated with a video ID, if the user had a positive interaction with the video by evaluating the tagged events. Certain events automatically indicate a video was positively interacted. For example, if a playback event, as described above, indicates the user continuously viewed the entire video, then the video was positively interacted. The user watching the entire video implies satisfaction in the video because the user took the time to view the video in its entirety. Alternatively, if the event comprises rating the video 5 out of 5 stars than the rating event implies user satisfaction with the video. These events automatically designate that the particular video being analyzed by the user interaction analysis server was positively interacted by the user. The video is then tagged with a "1" indicating the positive interaction. Additionally, videos can be positively interacted when the user rewinds the video and replays a part of the video or if a user leaves a positive comment about the video.

Videos can also be automatically tagged as negatively interacted with, based on certain events indicating a negative interaction. For example, if a watch ratio (e.g. the ratio of the play time to the length of the video) is less than a predetermined value, such as 25%, the event would automatically indicate that the user did not have a positive interaction and the video would be tagged with as negatively interacted with. Alternatively, if the video access log 160 comprises an event associated with the user rating the video a low score, such as 1 out of 5 stars, for example, the low rating event would automatically indicate that the user did not have a positive interaction with the video and the video would be tagged as being negatively interacted. Additionally, a video can be automatically tagged as being negatively interacted with if a user leaves a negative comment about the video or performs a new search.

Once all the videos in the video access log 160 associated with a particular user ID have been tagged as either being positively interacted or negatively interacted, the tagged list of videos are sequenced in time (e.g., by the time of the first user interaction) by the user interaction analysis server 130 to create a sequenced list of tagged videos. The tagged list of sequenced videos identifies videos that a user viewed chronologically in time indicating the videos the user had a positive interaction with and videos which were negatively interacted. By analyzing the tags associated with pairs of videos in a sliding window, the user interaction analysis server 130 determines pairs of videos which were positively interacted. Generally, when two videos within a selected time interval are both positively interacted with, then the videos are deemed to be related.

An example of the sequenced list of tagged videos is as follows:

| Video | Tag |
|---|---|
| $V_1$ | 1 |
| $V_2$ | 1 |
| $V_3$ | 0 |
| $V_4$ | 1 |

The column "Video" represents the various videos a user has viewed in the order of viewing based on time stamps stored in the video access log 160, where $V_1$, $V_2$, etc represent the individual videos watched by the user. The "Tag" column is representative of the associated video being tagged as either having a positive interaction (1) or having a negative interaction (0).

The fourth stage 408 of the user interaction analysis process processes the tagged videos in a sliding window as shown in the example below:

| Video | Tag |
|---|---|
| $V_1$ | 1 |
| $V_2$ | 1 |
| $V_3$ | 0 |
| $V_4$ | 1 |

The user interaction analysis server 130 utilizes a sliding window as one way of establishing a time interval, depicted by the rectangle enclosing the first three tags, to analyze the interaction tags to determine if a pair of videos was positively interacted by a user. The sliding window is iteratively advanced through the sequence of interaction tags for the user, and each pair wise combination of the first video in the window with each other video in the window is analyzed. All interaction tags within the sliding window are said to co-occur. Generally, the user interaction analysis server 130 identifies pairs of videos ($V_i$, $V_j$) where both videos are positively interacted with, that is where tags $T_i=T_j=1$. Each time a pair of videos ($V_i$, $V_j$) are positively interacted with, a co-occurrence matrix, as further described below, stores the positive counts of interactions between the pair of videos. Any other combination of interactions, such as tag pairs (1,0), (0,1) and (0,0), do not indicate a positive relationship between the two videos under consideration and are not reflected in the co-occurrence matrix.

In the above example, the sliding window allows for analysis of related videos for the target video, which in this example is $V_1$. The interaction tags of the first and second videos ($V_1$ and $V_2$ respectively) in the list are the first pair of tags to undergo analysis. In the case of $V_1$ and $V_2$, $V_1$ is tagged "1" which indicates the video was positively interacted and $V_2$ is also tagged "1" indicating the video was also positively interacted. The pair of videos were both tagged "1" which indicates a positive interaction between the pair of videos. Thus, $V_1$ and $V_2$ had co-occurring positive interactions. In the case of $V_1$ and $V_3$, $V_1$ is tagged "1" which indicates the video was positively interacted, but $V_3$ is tagged "0" which indicates a negative interaction with the video. Thus, this pair does not indicate a positive relationship between $V_1$ and $V_3$.

The sliding window below is an example of the sliding window analyzing the next target video, in this case the target video is $V_2$, with the possible video pair combinations with $V_3$ and $V_4$.

| Video | Tag |
|-------|-----|
| $V_1$ | 1 |
| $V_2$ | 1 |
| $V_3$ | 0 |
| $V_4$ | 1 |

Here, video pair $V_2$ and $V_3$ have a tag sequence of (1, 0) respectively, which does not indicate a positive relationship. The next pair combination with the target video for analysis is $V_2$ and $V_4$ which has a tag sequence of (1, 1) respectively, thus indicating a positive interaction was made with both videos which were sequentially viewed in time. Thus, $V_2$ and $V_4$ had co-occurring positive interactions.

The above example of the sliding window with three videos is a very simplified one for purposes of explanation only. Any number of methods to determine positive co-occurrences between videos can be used. More generally, the sliding window represents a time interval for identifying co-occurring positive interactions for pairs of videos. The sliding window can be implemented with either a fixed time length, or a variable time length. In one embodiment, the sliding window size is one (1) hour so that only pairs of videos viewed within one hour of each other are analyzed for positive interactions. Generally, when users are watching videos, multiple videos are viewed and the video content from the first video watched in the time session compared to the last video watched can differ greatly. Using a time window of one hour increases the likelihood that the videos in the sliding window are still related to one another.

Alternatively, the time length of the sliding window can be dynamic and vary based a number of factors. One factor for varying the sliding window length is user activity for the user whose videos are being processed. Some users view more videos than others either overall, or at faster rate (i.e., more videos per unit time). For users who view more videos per unit time, the sliding window can be adjusted to have a shorter time span, such as 30 minutes. The length of the window can be set for a user to reach a desired number of video views per unit time for the sliding window, based on the user's average rate of views. For example, if the user views an average of 20 videos per hour, and the target for the sliding window is 10 videos, then the sliding window length is set to 30 minutes for this user. Thus, a shorter time window is utilized to capture the shifts in interest for users who have a high view rate, so that the user interaction analysis server 130 can accurately determine related videos based on the viewing behaviors of each user. Another factor for dynamically varying the window length is whether the user performs a search during a viewing session. Here, each search is used to restart the sliding window, as the search is used to indicate a shift in user interest. Restarting the sliding window in response to a new search query prevents pairs of videos which were positively interacted, but are separated from a new search query event indicating a shift in user interest, from being considered related videos. Alternatively, the sliding window may be restarted in response to other user behaviors, such as a selection of a specific category or channel of videos for browsing.

Users who are not actively viewing videos may have a longer sliding window time where pairs of videos are analyzed by the user interaction analysis server 130. This is appropriate as some users may only view a few videos every few hours and as long as a new search is not performed, the sliding window is used to analyze the watched videos within a time frame of a few hours to a day, for example.

During the fourth stage 408 of the user interaction analysis process, the user interaction analysis server 130 may analyze the time stamps of the videos in the sliding window to determine if a software robot may be accessing the videos, to create inaccurate viewing data. The analysis server 130 uses a filter based on the rate of video accesses (e.g., views) by a user. For example, if a "user" has watched over 100 videos within a time span of 2 minutes, this would indicate to the user interaction analysis server 130 that a software robot has been accessing the videos, as no human is capable of viewing such a large quantity of videos in a short time span. This false activity detection filters out the interaction data that is created by a robot watching videos as the data can create false positives of videos that are said to have positively interacted, when in reality the pairs of videos were not related.

Once the user interaction analysis process completes for an individual user, the user interaction analysis process as previously discussed above in reference to FIG. 4, will be performed for all (or some selection of) users listed in the user database 150. After the user interaction analysis process is complete for the selected users, the co-occurrence matrix holds the updated the positive interaction counts between pairs of videos.

A co-occurrence matrix is used to store counts of positive interaction co-occurrences for each pair of videos in the database. Each time a pair of videos $(V_i, V_j)$ have a positive relationship (e.g., a pair of positive interactions), the interaction count for the pair is updated. The interaction counts are preferably incremented only uni-directionally, that is the count for $(V_i, V_j)$ is incremented, but not for $(V_j, V_i)$ where the positive interaction with $V_i$ precedes the positive interaction for $V_j$. Alternatively, the counts can be incremented bidirectionally, with the counts for both $(V_i, V_j)$ and $(V_j, V_i)$ updated. The co-occurrence counts will be used to rank the list of related videos, which is further described below. A simplified example of the co-occurrence table that is created by the user interaction analysis server 130 is as follows:

| Any Video | Related Videos | | | |
|-----------|------|------|------|------|
|  | $V_a$ | $V_b$ | $V_c$ | $V_d$ |
| $V_a$ | — | 15 | 2 | 30 |
| $V_b$ | 1 | — | 50 | 9 |
| $V_c$ | 2 | 1 | — | 20 |
| $V_d$ | 20 | 30 | 25 | — |

The table above depicts a very simplified co-occurrence table of the type that would be stored in the videos database 170. The videos $V_a$ through $V_d$ are illustrative of the total videos stored in the video database 190 and one skilled in the art will understand any number of videos can be stored in the video database 190. For any given video, such as $V_a$, a count (or real value) is maintained of every instance a positive interaction occurred between $V_a$ and related video $V_b$ through $V_d$ during the fourth stage 408 of the user interaction analysis process. The count is maintained across all users in the user database 150, thus the related video table represents all positive interactions between pairs of videos. In the example above, video $V_a$ was positively interacted with video $V_b$ 15 times while $V_a$ was positively interacted with video $V_c$ only 2 times. The positive interaction counts are analyzed by the user interaction analysis server 130 to generate a ranked list of related videos for any given video which is further described below.

In an alternative embodiment, real number weights are used to update the co-occurrence counts, by weighting the interaction tags for videos according to a distance measure between the two videos. One method of weighting the interactions is to use position distance within the sliding window, as follows. Within the sliding window, there is the target video (the first video) and each of the remaining videos, the second through Nth video. Each video (or position in the list) is given a weight, starting with a highest weight (1) for the second video, and scaled through the Nth video over a range from the maximum weight of 1 to a minimum weight. The weighting can be a step function, a linear function, a logarithmic function, or some other function. For example, in a sliding window of 5 videos, a step function would weight the videos with values of 0.9, 0.8, 0.7, and 0.6, for the second through fifth videos respectively. When updating the co-occurrence count for a pair of videos $(V_i, V_j)$, the count is updated by the weight for video $V_j$. This reflects that the greater the temporal separation between the two videos, the less significant is the positive relationship between them deemed to be.

Alternatively, the weights can be decayed using a distance measure based on time. The weight of the interaction can be inversely related to the length of time between the time the target video was viewed and the time the second video was viewed. Alternatively, the weight can be inversely proportional to the length of time between when the second video was viewed and the current time when the analysis is being performed.

The user interaction analysis server 130 analyzes the co-occurrence table to generate a ranked list of related videos for any given video. Additionally, if a related video is not positively interacted a predetermined amount of total instances (i.e. spam), the given video can be removed from the related videos database 175 until the next user interaction analysis process occurs. Once all spam has been removed from the table, a ranked list of related videos is created for every video in the video database 190. The ranking can be based on any number of criteria. In one embodiment, the ranking occurs based on the total amount of positive interactions. For example, for a given row, representing a video (e.g., $V_a$), the videos listed therein can be sorted by their interaction counts, from highest to lowest. This forms a list of videos that are related to the given video. Thus, for a given video, the related video with the highest count of positive interactions would be the first video displayed in related videos section 303 of the video viewing page shown in FIG. 3. For example using the previous table above, if a user selected a target video for viewing such as a video $V_a$, the related videos would be listed in the order $V_d$, $V_b$, and $V_c$. Videos with a positive interaction count below a minimum threshold (e.g., 10) may be removed, for example $V_c$, which has a count of 2.

Alternatively, the related videos can be ranked based on the total accumulated time watched for each related video. Because each count of positive interaction is associated with a particular user in the user database 150, the user interaction analysis server 130 can determine the total amount of time a related video was viewed by all users, by retrieving the playback event data from the video access log 160. This method of ranking the related videos is beneficial because though a particular video had the most counts of positive interactions it may not necessarily be the most related video. The video may have just met the minimum criteria to be determined positively interacted in the third stage 406 of the user interaction analysis process amongst all the users, whereas another related video may have had a lower amount of positive interactions, but each user who had a positive interaction with the related video watched the video entirely. This method takes into account the playback event, which is one of the most significant events that indicate a positive interaction with a video. For example, even though video $V_d$ has a higher positive interaction count then $V_b$ above, the total playback time for $V_b$ may be higher then for $V_d$. Alternatively, the related videos can be ranked by their rating data, number of comments, recency of posting, other metadata, or aggregated data, or upon a weighted combination of these various metrics (including positive co-occurrence count).

The ranked list of related videos for all videos in the video database 190 is stored in the related videos database 170. The ranked list of related videos is used by the video search server 145 to return a list of related videos 303 after a target video has been selected for viewing by the user. The return list of related videos 303 can be ranked according to a separate criteria or attribute from that used to select the list. For example, the ranking for selection as related videos can be based on the counts of the positive co-occurring interactions, while the ranking for display can be based on total playback time of each of the selected videos.

The ranked list of related videos in one embodiment is updated on a daily basis through the user interaction analysis process described above. This beneficially ensures the most up to date relevant videos is presented to users. Alternatively, the ranked list is updated once a week or once a month. The time in which the ranked list is updated is merely illustrative of the times in which an appropriate update can take place and the update can occur at any suitable time set by the administrator of the video hosting website 100.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method for selecting a set of videos related to a first video, the method comprising:
   receiving data representative of interactions with videos by a plurality of users;
   identifying, from the received data for a first video, those interactions that are positive interactions with the first video, the positive interactions indicating user interest in the first video that occurred after playback of the first video began;
   identifying, from the received data for a plurality of second videos, those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

generating co-occurring positive interactions for the first video and each of the plurality of second videos based on the identified positive interactions, a co-occurring positive interaction for the first video and a second video indicating interest of a user in both the first video and the second video after playback of the first video and playback of the second video within the locality of time;

assigning a weight to each of a plurality of the co-occurring positive interactions for the first video and each of the plurality of second videos, the assigned weight for a co-occurring positive interaction for the first video and each of the plurality of second videos based on a length of time between viewing of the first video and each of the plurality of second videos;

storing a count of co-occurring positive interactions for the first video and each of the plurality of second videos based on the weighted co-occurring positive interactions for the first video and each of the plurality of second videos;

ranking, by a computer, each of the plurality of second videos using the counts of co-occurring positive interactions;

selecting the set of related videos for the first video from the plurality of second videos using the ranked counts of co-occurring positive interactions;

ranking, by the computer, the plurality of second videos included in the set of related videos for the first video based at least in part on a total duration of watch time of each of the plurality of second videos by the plurality of users; and storing an indication of the set of related videos.

2. The computer implemented method of claim 1, further comprising:
storing for each of the plurality of users, user events indicating positive interactions with the first video; and
storing for each of the plurality of users, user events indicating positive interactions with any of the plurality of second videos.

3. The computer implemented method of claim 2, further comprising:
determining from the user events, a count of the co-occurring positive interactions by individual users of the first video and each of the second videos.

4. The computer implemented method of claim 2, wherein user events indicating positive interactions comprises a video watch ratio greater than a predetermined value.

5. The computer implemented method of claim 1, wherein storing the indication of the set of related videos comprises:
generating a list of related videos for the first video using the selected set of related videos from the ranked plurality of second videos.

6. The computer implemented method of claim 1, further comprising:
filtering the count of co-occurring positive interactions to remove interactions indicating that the first video and one of the plurality of second videos were accessed by a malicious software program that accessed the first video and the plurality of second videos.

7. A computer implemented method for determining co-occurring positive interactions between videos to create a list of related videos, the method comprising:
receiving data representative of interactions with videos by a plurality of users;

for at least one video, identifying from the received data those interactions that are positive interactions with the at least one video, the positive interactions indicating user interest in the at least one video that occurred after the at least one video loaded for display;

for a plurality of second videos, identifying from the received data those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

for a plurality of users, determining, by a computer system, co-occurring positive interactions for pairs of videos interacted with by the plurality of users, wherein a co-occurring positive interaction for a pair of videos indicates user interest in both the at least one video and a second video from the plurality of second videos after the at least one video loaded for display and the second video loaded for display within the locality of time;

for the at least one video, assigning a weight to each of a plurality of the co-occurring positive interactions for the at least one video and each of the plurality of second videos included in the pairs of videos, the assigned weight for a co-occurring positive interaction for the at least one video and each of the plurality of second videos included in the pairs of videos based on a length of time between viewing of the at least one video and each of the plurality of second videos included in the pairs of videos;

for the at least one video, determining counts of co-occurring positive interactions between the at least one video and each of the plurality of second videos included in the pairs of videos based on the weighted co-occurring positive interactions for the at least one video and each of the plurality of second videos included in the pairs of videos;

for the at least one video, ranking, by a computer, each of the plurality of second videos using the counts of co-occurring positive interactions between the at least one video and the plurality of second videos;

for the at least one video, selecting a list of related videos for the at least one video from the plurality of second videos using the ranked counts of co-occurring positive interactions; and for the at least one video, ranking, by the computer, the plurality of second videos included in the list of related videos based at least in part on a total duration of watch time of each of the plurality of second videos by the plurality of users.

8. A video hosting website for determining related videos, the video hosting website comprising:
a video database storing videos;
a video access log comprising events, wherein the events are received data representative of user interactions with videos from a plurality of users, the events including positive interactions;
a user interaction analysis server configured to:
identify, from the received data for a first video, those interactions that are positive interactions with the first video, the positive interactions indicating user interest in the first video that occurred after playback of the first video began;
identify, from the received data for a plurality of second videos, those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

generate co-occurring positive interactions for the first video and each of the plurality of second videos based on the identified positive interactions, a co-occurring positive interaction for the first video and a second video indicating interest of a user in both the first video and the second video after playback of the first video and playback of the second video within the locality of time;

assign a weight to each of a plurality of the co-occurring positive interactions for the first video and each of the plurality of second videos, the assigned weight for a co-occurring positive interaction for the first video and each of the plurality of second videos based on a length of time between viewing of the first video and each of the plurality of second videos;

determine counts of co-occurring positive interactions for the first video and each of the plurality of second videos based on the weighted co-occurring positive interactions for the first video and each of the plurality of second videos;

rank each of the plurality of second videos using the counts of co-occurring positive interactions;

select the set of related videos for the first video from the plurality of second videos using the ranked counts of co-occurring positive interactions; and rank the plurality of second videos included in the set of related videos for the first video based at least in part on a total duration of watch time of each of the plurality of second videos by the plurality of users; and a related videos database adapted to store for the first video an indication of the set of related videos.

9. A computer program product for selecting a set of videos related to a first video, comprising a non-transitory computer-readable storage medium containing executable computer program code for:

receiving data representative of interactions with videos by a plurality of users;

identifying, from the received data for a first video, those interactions that are positive interactions with the first video, the positive interactions indicating user interest in the first video that occurred after playback of the first video began;

identifying, from the received data for a plurality of second videos, those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

generating co-occurring positive interactions for the first video and each of the plurality of second videos based on the identified positive interactions, a co-occurring positive interaction for the first video and a second video indicating interest of a user in both the first video and the second video after playback of the first video and playback of the second video within the locality of time;

assigning a weight to each of a plurality of the co-occurring positive interactions for the first video and each of the plurality of second videos, the assigned weight for a co-occurring positive interaction for the first video and each of the plurality of second videos based on a length of time between viewing of the first video and each of the plurality of second videos;

storing a count of co-occurring positive interactions for the first video and each of the plurality of second videos based on the weighted co-occurring positive interactions for the first video and each of the plurality of second videos;

ranking, by a computer, each of the plurality of second videos using the counts of co-occurring positive interactions;

selecting the set of related videos for the first video from the plurality of second videos using the ranked counts of co-occurring positive interactions;

ranking, by the computer, the plurality of second videos included in the set of related videos for the first video based at least in part on a total duration of watch time of each of the plurality of second videos by the plurality of users; and storing an indication of the set of related videos.

10. The computer program product of claim 9, the method further comprising:

storing for each of the plurality of users, user events indicating positive interactions with the first video; and storing for each of the plurality of users, user events indicating positive interactions with any of the plurality of second videos.

11. The computer program product of claim 10, wherein user events indicating positive interactions comprises a video watch ratio greater than a predetermined value.

12. The computer program product of claim 10, the method further comprising:

determining from the user events, a count of the co-occurring positive interactions by individual users of the first video and each of the second videos.

13. The computer program product of claim 9, wherein storing the indication of the set of related videos comprises:

generating a list of related videos for the first video using the selected set of related videos from the ranked plurality of second videos.

14. The computer program product of claim 9, the method further comprising:

filtering the count of co-occurring positive interactions to remove interactions indicating that the first video and one of the plurality of second videos were accessed by a software program, the software program not operated by a user.

15. A computer program product for determining co-occurring positive interactions between videos to create a list of related videos comprising, a non-transitory computer readable storage medium storing computer executable instructions for:

receiving data representative of interactions with videos by a plurality of users;

for at least one video, identifying from the received data those interactions that are positive interactions with the at least one video, the positive interactions indicating user interest in the at least one video that occurred after the at least one video loaded for display;

for a plurality of second videos, identifying from the received data those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

for a plurality of users, determining, by a computer system, co-occurring positive interactions for pairs of videos interacted with by the plurality of users, wherein a co-occurring positive interaction for a pair of videos indicates user interest in both the at least one video and a second video from the plurality of second videos after the at least one video loaded for display and the second video loaded for display within the locality of time;

for the at least one video, assigning a weight to each of a plurality of the co-occurring positive interactions for the at least one video and each of the plurality of second videos included in the pairs of videos, the assigned weight for a co-occurring positive interaction for the at least one video and each of the plurality of second videos included in the pairs of videos based on a length of time between viewing of the at least one video and each of the plurality of second videos included in the pairs of videos;

for the at least one video, determining counts of co-occurring positive interactions between the at least one video and each of the plurality of second videos included in the pairs of videos based on the weighted co-occurring positive interactions for the at least one video and each of the plurality of second videos included in the pairs of videos;

for the at least one video, ranking, by a computer, each of the plurality of second videos using the counts of co-occurring positive interactions between the at least one video and the plurality of second videos;

for the at least one video, selecting a list of related videos for the at least one video from the plurality of second videos ranked using the ranked counts of co-occurring positive interactions; and for the at least one video, ranking, by the computer, the plurality of second videos included in the list of related videos based at least in part on a total duration of watch time of each of the plurality of second videos by the plurality of users.

16. A computer program product for identifying related videos in plurality of videos V comprising video $(V_1, \ldots V_n)$, comprising a non-transitory computer-readable storage medium containing executable computer program code for:

for at least one pair of videos $(V_i, V_j)$ in the plurality of videos V, generating co-occurring positive interactions for the at least one pair of videos $(V_i, V_j)$ in the plurality of videos V wherein a co-occurring positive interaction for a pair of videos $(V_i, V_j)$ indicates interest of a user in both the video $V_i$ and the video $V_j$ that occurred after the video $V_i$ loaded for display and the video $V_j$ loaded for display, wherein the video $V_j$ loaded for display within a locality of time that video $V_i$ loaded for display;

for at least one pair of videos $(V_i, V_j)$ in the plurality of videos V, assigning a weight to each of a plurality of the co-occurring positive interactions for the at least one pair of videos $(V_i, V_j)$, the assigned weight for a co-occurring positive interaction for the at least one pair of videos $(V_i, V_j)$ based on a length of time between viewing video $V_i$ and each of the second videos $V_j$;

for at least one pair of videos $(V_i, V_j)$ in the plurality of videos V, storing a count $C_{i,j}$ the co-occurring positive user interactions for the pair of videos $(V_i, V_j)$ based on the weighted co-occurring positive interactions for the pair of videos $(V_i, V_j)$ for at least one video $V_i$, ranking the videos $V_j$ using the counts $C_{i,j}$;

for at least one video $V_i$, identifying a set $R_i$ of related videos V from the ranked second videos $V_j$, using the ranked counts $C_{i,j}$; and for at least one video $V_i$, ranking the second videos $V_j$ included in the set $R_i$ of related videos V based at least in part on a total duration of watch time of each of the second videos $V_j$ by a plurality of users that viewed the second videos.

17. The computer implemented method of claim 1, wherein the counted co-occurring positive interactions occur over the locality of time.

18. A computer implemented method for selecting a set of videos related to a first video, the method comprising:

receiving data representative of interactions with videos by a plurality of users;

identifying, from the received data for a first video, those interactions that are positive interactions with the first video, the positive interactions indicating user interest in the first video that occurred after playback of the first video began;

identifying, from the received data for a plurality of second videos, those interactions that are positive interactions with the plurality of second videos, the positive interactions indicating user interest in the plurality of second videos that occurred after playback of the plurality of second videos began, wherein playback of the plurality of second videos occurred within a locality of time after playback of the first video;

generating co-occurring positive interactions for the first video and each of the plurality of second videos based on the identified positive interactions, a co-occurring positive interaction for the first video and a second video indicating interest of a user in both the first video and the second video after playback of the first video and playback of the second video within the locality of time;

assigning a weight to each of a plurality of the co-occurring positive interactions for the first video and each of the plurality of second videos, the assigned weight for a co-occurring positive interaction for the first video and each of the plurality of second videos based on a length of time between viewing of the first video and each of the plurality of second videos;

storing a count of co-occurring positive interactions for the first video and each of the plurality of second videos based on the weighted co-occurring positive interactions for the first video and each of the plurality of second videos;

ranking, by a computer, each of the plurality of second videos based at least in part on the counts of co-occurring positive interactions and a total duration of watch time of each of the plurality of second videos by the plurality of users;

selecting the set of related videos for the first video based at least in part on the ranked plurality of second videos; and storing an indication of the set of related videos.

* * * * *